(12) United States Patent
Agrawal

(10) Patent No.: US 6,250,106 B1
(45) Date of Patent: Jun. 26, 2001

(54) PROCESS FOR SEPARATION OF MULTICOMPONENT FLUIDS USING A MULTIZONE DISTALLATION COLUMN

(75) Inventor: Rakesh Agrawal, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/460,132

(22) Filed: Dec. 13, 1999

(51) Int. Cl.[7] .................................. F25J 3/00; F25J 5/00
(52) U.S. Cl. .................................. 62/643; 62/905; 62/924
(58) Field of Search .............................. 62/643, 646, 905, 62/924

(56) References Cited

U.S. PATENT DOCUMENTS

| | | | |
|---|---|---|---|
| 2,471,134 | 5/1949 | Wright | 196/100 |
| 3,844,898 | 10/1974 | De Graff . | |
| 5,339,648 | * 8/1994 | Lockett et al. | 62/643 |
| 5,669,236 | * 9/1997 | Billingham et al. | 62/643 |
| 5,768,904 | * 6/1998 | Tagamolila | 62/238.3 |
| 5,946,942 | 9/1999 | Wong et al. | 62/643 |

OTHER PUBLICATIONS

"Minimum Energy Requirements of Thermally Coupled Distillation Systems", Z. Fidkowski, L. Korlikowksi, AIChE Journal, pp. 643–653, vol. 33, 1987.

"Advanced Distillation Saves Energy & Capital", F. Lestak and C. Collins, Chemical Engineering, Jul. 1997, pp. 72–76.

"Operation and Control of Dividing Wall Distillation Columns, Part 1: Degrees of Freedom and Dynamic Simulations", M. I. Abdul Mutalib and R. Smith, Trans IChemE, vol. 76, Part A, p. 308, 1998.

"Multicomponent Distillation—Theory and Practice" by Petluyuk and Cerifimow (p. 198, figure VI–4e, published by Moscow Chemie, 1983).

"Distillation Columns with Vertical Partitions", G.Kaibel, Chem. Eng. Technol., vol. 10, pp. 92–98, 1987.

"Partitioned Petlyuk Arrangement for Quaternary Separations", A.C. Christiansen, S. Skogestad and K. Lien, IChemE Symp. Series. No. 142, pp. 745–756, 1997.

"More Operable Fully Thermally Coupled Distillation Column Configurations for Multicomponent Distillation", R. Agrawal, Trans. IChemE., Part A.

* cited by examiner

Primary Examiner—William Doerrler
(74) Attorney, Agent, or Firm—Willard Jones, II

(57) ABSTRACT

A process uses a multizone distillation column for the separation of a multicomponent feed into one stream enriched in the most volatile component, one stream enriched in the least volatile component, and at least two other streams enriched in a component of intermediate volatility. The multizone distillation column has at least two vertical partitions, thereby creating a primary distillation zone and at least two secondary distillation zones. Each of the secondary distillation zones is fed with a mixture from another distillation zone, and a product stream enriched in a component of intermediate volatility is produced from each of the secondary distillation zones. At least one secondary distillation zone receives either at least a portion of the vapor boilup or a portion of the liquid reflux from a source external to the multizone distillation column or through heat exchange with a utility source that is external to the multizone distillation column.

15 Claims, 8 Drawing Sheets

US 6,250,106 B1

PROCESS FOR SEPARATION OF MULTICOMPONENT FLUIDS USING A MULTIZONE DISTALLATION COLUMN

CROSS-REFERENCE TO RELATED APPLICATIONS

Not Applicable.

STATEMENT REGARDING FEDERALLY SPONSORED RESEARCH FOR DEVELOPMENT

Not Applicable.

BACKGROUND OF THE INVENTION

The present invention pertains to the field of distillation of fluid mixtures, and in particular to distillation processes to separate multicomponent mixtures containing three or more components into at least four product streams each enriched in one of the components.

Consider the distillation of a multicomponent feed into multiple product streams each enriched in one of the components. Thermally coupled distillation column configurations are known to reduce total heat needed for the feed mixtures containing more than two components ("Minimum Energy Requirements of Thermally Coupled Distillation Systems," Z. Fidkowski, L. Krolikowski, AIChE Journal, pages 643–653, Volume 33, 1987). Specifically, for a ternary feed mixture it has been proven that a fully thermally coupled distillation configuration requires the lowest heat duty. However, conventional thermally coupled column arrangements require multiple distillation columns that lead to capital intensive processes.

A divided wall column arrangement for a ternary feed mixture is taught in U.S. Pat. No. 2,471,134 (Wright) as a means to reduce capital cost. As shown in FIG. 1, this prior art arrangement used only one column shell with one reboiler and one condenser. In FIG. 1, a ternary feed mixture 110 is fed to a distillation column 120. In this ternary feed mixture, A is the most volatile component and C is the least volatile component. From the top of the distillation column a vapor stream 140 rich in the most volatile component A is recovered. After condensation of this vapor stream in condenser 142, a portion is returned as liquid reflux stream 146 to the distillation column and the other portion is recovered as product stream 148. From the bottom of the distillation column a liquid stream 150 rich in the least volatile component C is collected. A portion of this liquid stream is collected as a product stream 158 and the rest of the portion is boiled in reboiler 152 and fed as vapor boilup stream 156 to the bottom of the distillation column. The divided wall 130 is located in the distillation column such that at the upper end u of the divided wall the descending liquid is composed primarily of A and B and is nearly free of the least volatile component C. Similarly, at the bottom end b of the divided wall, the ascending vapor is primarily composed of B and C and is nearly free of the most volatile component A. Therefore, it is possible to draw a B-rich product stream 168 from an intermediate location of the distillation column from the side of the wall that is opposite to the feed side.

Wright's divided wall column is an example of a distillation column that contains one partition and has two distillation zones. The primary distillation zone is the region containing the feed point of mixture 110 and the top and the bottom portions producing streams 140 and 150. The partition creates a secondary distillation zone producing B-enriched product stream 168. The liquid feed and the liquid reflux to the secondary distillation zone are provided directly from the primary distillation zone at the upper end u of the divided wall. Similarly, all of the vapor boilup at the bottom of the secondary distillation zone is provided from the primary distillation zone at the lower end b of the divided wall 130.

Wright's divided wall column is equivalent to a fully thermally coupled scheme and therefore requires low heat duty. Even though this scheme has been known for over 50 years, its use has been limited due to operational and control problems.

Recently, some attempts have been made to use Wright's divided wall column for some separations that are not very sensitive to liquid and vapor traffics in certain sections of the column. An example of such applications is in a paper by Lestak and Colllins ("Advanced Distillation Saves Energy & Capital", F. Lestak and C. Collins, Chemical Engineering, July 1997, pages 72–76). However, Abdul Mutalib and Smith found in their recent pilot plant studies that such a column arrangement is quite inflexible ("Operation and Control of Dividing Wall Distillation Columns, Part I: Degrees of Freedom and Dynamic Simulations", Trans IChemE, Vol. 76, Part A, page 308, 1998). It is difficult to control the descending liquid split on both of the sides of the divided wall at the top of the wall. Similarly, the vapor split on each side of the wall is difficult to control as it is affected by the liquid split. Generally, a distillation is sensitive to liquid to vapor flow ratios, and a lack of proper control of this ratio on each side of the divided wall makes Wright's divided wall column less attractive.

In the book entitled "Multicomponent Distillation—Theory and Practice", by Petluyuk and Cerifimow (page 198, FIG. VI-4e, published by Moscow Chemie, 1983), the authors disclose a configuration for a divided wall column where the partitioning wall is cylindrical and forms an annular or separation zone wherein the top and bottom communicate with the main distillation column.

Kaibel suggested a distillation with multiple divided walls to separate a feed mixture containing more than three components ("Distillation Columns with Vertical Partitions," G. Kaibel, Chem. Eng. Technol., Vol. 10, pages 92–98, 1987). Specifically, Kaibel showed arrangements to distill a four-component mixture and an eight-component mixture using divided walls with one reboiler and one condenser. His separation schemes used sharp splits between the components of intermediate volatility to distribute mixtures on various sides of the divided walls.

Recently, divided wall arrangements to separate a multicomponent mixture containing more than three components without any sharp split between the components of intermediate volatilities have been suggested by Christensen et al and by Agrawal ("Partitioned Petlyuk Arrangement For Quaternary Separations", A. C. Christiansen, S. Skogestad, and K. Lien, IChemE Symp. Series No. 142, pages 745–756, 1997; "More Operable Fully Thermally Coupled Distillation Column Configurations for Multicomponent Distillation", R. Agrawal, Trans. IChemE., Volume 77, Part A, pages 543–553, 1999). In these arrangements, a single distillation column with multiple internal partitions (walls) is used to produce all of the product streams, and the distillation column employs only one reboiler and one condenser. These arrangements suffer from the same problems of controlling the vapor and liquid flows as does Wright's column for a ternary feed.

FIG. 3 of the paper by Christensen et al. discloses the distillation of a four-component mixture where the liquid at the bottom of a secondary distillation zone producing a component of intermediate volatility (B) is boiled by heat exchange with vapor from the top of another secondary distillation zone producing another component of intermediate volatility (C). Such a heat transfer from one secondary distillation zone to another secondary distillation zone makes the independent control of liquid and vapor flows in each distillation zone extremely difficult. Operation of this type of distillation column would be quite difficult.

U.S. Pat. No. 5,946,942 (Wong, et al.) discloses an application of divided-wall principles to air separation. In this patent, an apparatus is described wherein the lower pressure column contains an inner annular wall. The region contained between the inner annular wall and the outer shell of the lower pressure column constitutes a secondary distillation zone that is used for the production of product argon. A drawback of this patent is that it does not teach a multizone distillation configuration to produce multiple product streams enriched in components of intermediate volatility.

The prior distillation schemes that require lower heat duty are quite complex and difficult to operate. As a result, many of these schemes lack operating flexibility and are rarely used in industry. Therefore, there is a need for distillation schemes that are easy to operate while having low heat requirements.

It is desired to have a more efficient and more operable multizone distillation process to distill a multicomponent feed stream into multiple product streams.

It is further desired to have multizone distillation processes that are easy to operate while having low heat requirements.

It also is desired to have multizone distillation processes which overcome the difficulties and disadvantages of the prior art to provide better and more advantageous results.

BRIEF SUMMARY OF THE INVENTION

A first embodiment of the present invention is a process for separation of a multicomponent fluid containing at least three components, each component having a different volatility, into at least four product streams. The process uses at least one multizone distillation column having a top, a bottom, a primary distillation zone, and at least two secondary distillation zones, each secondary distillation zone having a top and a bottom. The process includes multiple steps. The first step is to feed the multicomponent fluid into the primary distillation zone. The second step is to transfer a first mixture from the primary distillation zone to a first secondary distillation zone, the first mixture being lean in at least one component of the multicomponent fluid. The third step is to transfer a second mixture to a second secondary distillation zone from the primary distillation zone or the first secondary distillation zone. The second mixture is lean in at least one other component of the multicomponent fluid or at least one component of the first mixture. The fourth step is to remove a first product stream rich in a first component having a highest volatility from the top of the multizone distillation column. The fifth step is to remove a second product stream rich in a second component having a lowest volatility from the bottom of the multizone distillation column. The sixth step is to remove from the first secondary distillation zone or the second secondary distillation zone a third product stream rich in a third component having an intermediate volatility between the highest volatility and the lowest volatility. The seventh step is to feed the first secondary distillation zone or the second secondary distillation zone at least a portion of (i) a vapor boilup stream, or (ii) a liquid reflux stream, wherein the at least a portion of (i) the vapor boilup stream, or (ii) the liquid reflux stream is fed from a source external to the multizone distillation column or through heat exchange with a utility source external to the multizone distillation column.

A second embodiment is similar to the first embodiment but includes an additional step. The additional step is to remove from one of the at least two secondary distillation zones a fourth product stream rich in a fourth component having either the same intermediate volatility as the third component or another intermediate volatility different than the intermediate volatility of the third component, said another intermediate volatility being between the highest volatility and the lowest volatility, wherein the fourth product stream and the third product stream are removed from different secondary distillation zones.

The process may be used for separating numerous types of multicomponent fluids. For example, the multicomponent fluid may be selected from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-n-butane-gasoline, and combinations of three or more components from C1 to C6 hydrocarbons or $C_4$ isomers.

The present invention also includes a number of variations of the first embodiment. For example, in one variation, the multicomponent fluid contains at least four components. In another variation, the at least one secondary distillation zone has a cylindrical vertical separation element.

In another variation of the first embodiment, the vapor boilup stream is provided by vaporizing at least a portion of a liquid stream withdrawn from the first or second secondary distillation zone through heat exchange with an external heat source. In a variant of this variation, the first or second secondary distillation zone being fed the vapor boilup has an end separating element between said secondary distillation zone and the primary distillation zone or another secondary distillation zone.

In another variation of the first embodiment, the liquid reflux stream is provided by condensing at least a portion of a vapor stream withdrawn from the first or second secondary distillation zone through heat exchange with an external cold source. In a variant of this variation, the first or second secondary distillation zone being fed the liquid reflux stream has an end separating element between said secondary distillation zone and the primary distillation zone or another secondary distillation zone.

In another variation of the first embodiment, the vapor boilup stream is fed to the bottom of the first secondary distillation zone or the secondary distillation zone.

In yet another variation of the first embodiment, the liquid reflux stream is fed to the top of the first secondary distillation zone or the second secondary distillation zone.

Another aspect of the present invention is a cryogenic air separation unit using a process as in any one of the embodiments or variations discussed above. For example, the cryogenic air separation unit may use a process such at that in the first embodiment of the present invention.

DETAILED DESCRIPTION OF THE INVENTION

The present invention is a process for the separation of a multicomponent feed in a distillation system comprising at least one multizone distillation column. The multizone distillation column is characterized by:

a) it has at least two vertical partitions that create a primary distillation zone and at least two secondary distillation zones;

b) the multicomponent stream is fed to the primary distillation zone and a product stream enriched in the most volatile component is produced from the top of this zone and a product stream enriched in the least volatile component is produced from the bottom of this zone;

c) each of the secondary distillation zones is fed with a mixture from either the primary distillation zone or another secondary distillation zone;

d) a product stream enriched in a component of intermediate volatility is produced from each of the secondary distillation zones; and e) at least one secondary distillation zone receives either at least a portion of the vapor boilup of the distillation zone or at least a portion of the liquid reflux of the distillation zone either from a source external to the multizone distillation column or through heat exchange with a utility source that is external to the multizone distillation column.

Although not essential, the vapor boilup in paragraph (e) generally is provided at the bottom of the secondary distillation zone. Similarly, the liquid reflux generally is provided at the top of the secondary distillation zone. In the preferred mode of operation, the end of the secondary distillation zone receiving the vapor boilup or the liquid reflux generally will be isolated from the other distillation zones by an end separating element. Due to this isolation, no mass is transferred through this end of the secondary distillation zone from any other distillation zone of the multizone distillation column.

The multicomponent feed stream can contain three or more components and the multizone distillation column will produce at least four product streams. In the preferred embodiment, the multicomponent feed stream will contain four or more components.

Figure 2:
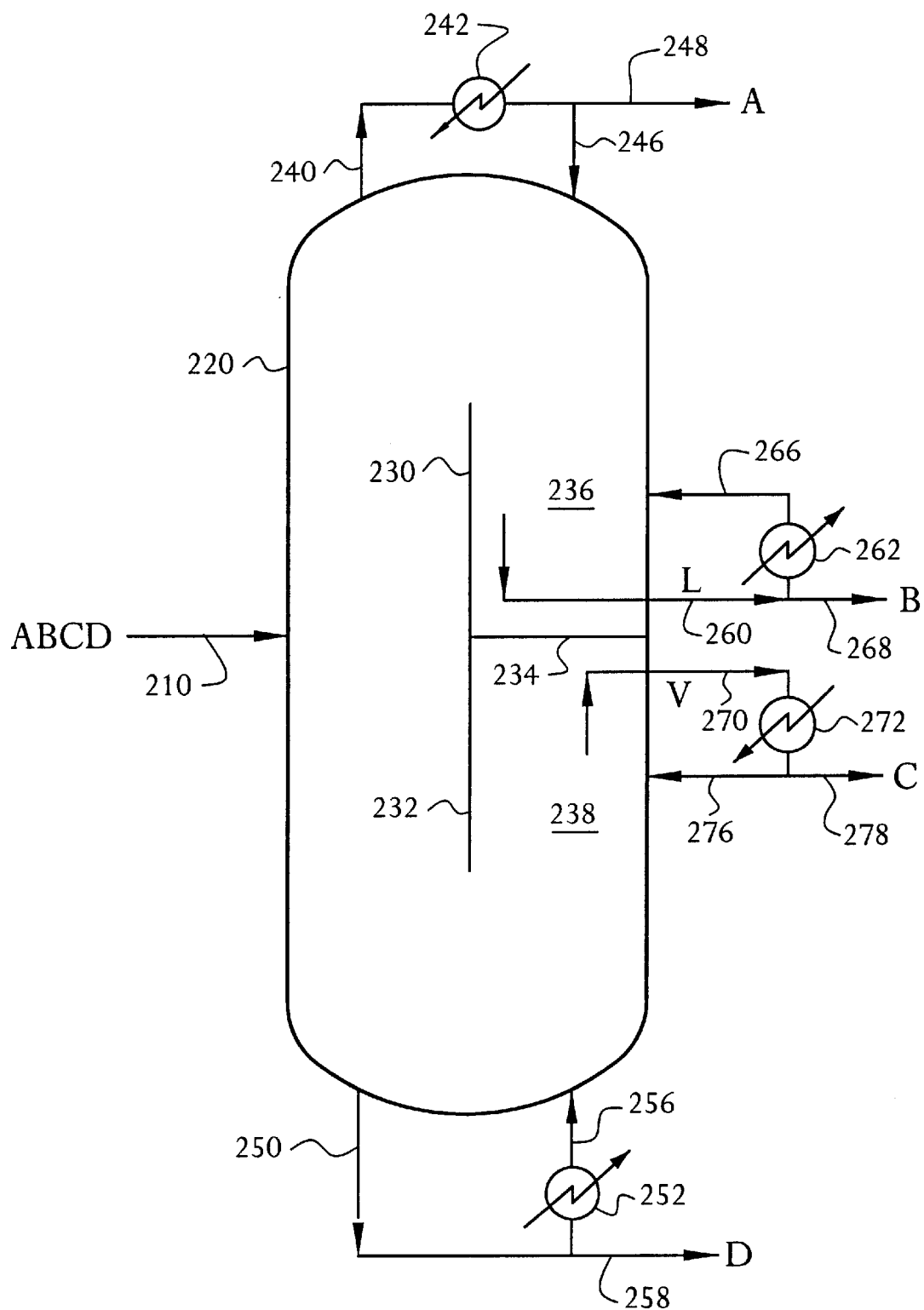
FIG. 2 is a schematic diagram of an embodiment of the present invention.

A process according to the prevent invention is shown in FIG. 2. The multicomponent feed 210 contains four components A, B, C and D. Component A is the most volatile component, component D is the least volatile component, and component B is more volatile than component C. This multicomponent feed is fed to a multizone distillation column 220. The multizone distillation column has two secondary distillation zones 236 and 238. The secondary distillation zone 236 is created by the vertical partition 230 and the end separating element 234. The secondary distillation zone 236 starts at the top of the vertical partition 230 where a liquid mixture rich in components A and B enters this distillation zone. The secondary distillation zone 236 terminates at the end separating element 234. The other secondary distillation zone 238 is created by the vertical partition 232 and the end separating element 234. This secondary distillation zone starts at the bottom end of the vertical partition 232 where a vapor mixture rich in components C and D enters this secondary distillation zone. The secondary distillation zone 238 terminates at the end separating element 234. The primary distillation zone of the multizone distillation column 220 is defined as all the portions of the multizone distillation column 220 excluding the two secondary distillation zones 236 and 238.

Figure 1:
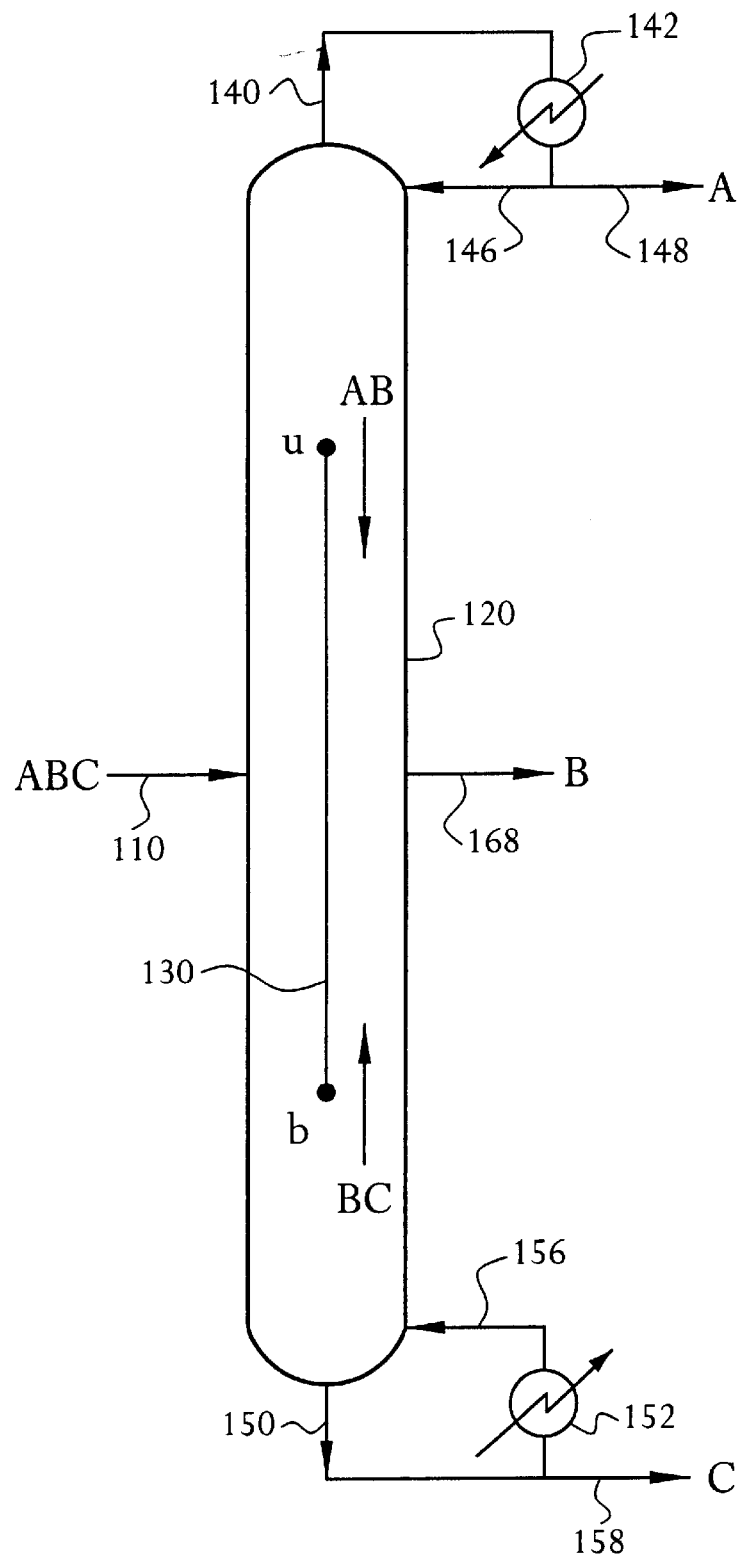
FIG. 1 is a schematic diagram of a prior art process.

Thus, according to paragraph (b) of the present invention, a vapor stream 240 enriched in the most volatile component A is produced from the top of the primary distillation zone, as shown in FIG. 1. In this figure, all of the vapor stream is sent to a condenser 242. A portion of the condensed stream is returned to the column as liquid reflux stream 246 and the other portion is recovered as a product stream 248 enriched in the most volatile component A. The liquid stream 250 from the bottom of the primary distillation zone is enriched in the least volatile component D. A portion of this liquid stream is recovered as a product stream 258 enriched in the least volatile component D, while the other portion is vaporized in heat exchanger 252 and returned to the column as vapor stream 256.

Each of the secondary distillation zones produces a product stream enriched in a component of intermediate volatility. From the bottom of the secondary distillation zone 236, a liquid (L) stream 260 enriched in component B is withdrawn. A portion of this liquid stream is recovered as B-enriched product stream 268. The other portion is vaporized in heat exchanger 262 by heat exchange with a heat utility that is external to the multizone distillation column 220. The resulting vaporized stream 266 is fed as vapor boilup to the bottom of the secondary distillation zone 236. From the top of the secondary distillation zone 238, a vapor (V) stream 270 enriched in component C is withdrawn and sent to a condenser 272. In this condenser, the vapor stream is condensed by heat exchange with a cold utility that is external to the multizone distillation column 220. While a portion of the condensed stream is recovered as a C-enriched product stream 278, the other portion is returned to the top of the secondary distillation zone 238 as a liquid reflux stream 276.

In the process of FIG. 2, the only source of vapor boilup at the bottom of the secondary distillation zone 236 is through heat exchanger 262. This is the preferred mode of the present invention. However, if needed, some vapor could be transferred at the bottom of the secondary distillation zone 236 from another distillation zone of the multizone distillation column 220. A portion of the vapor could be generated by heat exchange with the vapor from the top of the secondary distillation zone 238. In any event, at least some vapor boilup at the bottom of the secondary distillation zone 236 must be generated through a heat source external to the multizone distillation column 220. This allows an external control of vapor flow in the secondary distillation zone 236 and makes the operation of the multizone distillation column 220 much easier. This provides an external mechanism to adjust the vapor flow in the secondary distillation zone 236 and to produce the B-enriched product stream 268 of a desired purity. The same is true for the liquid reflux needed for the secondary distillation zone 238. While some liquid reflux at the top of the secondary distillation zone 238 can be provided by either direct mass transfer or heat exchange with another distillation zone of the multizone distillation column 220, at least some liquid reflux must be provided through a cold source external to the multizone distillation column 220.

In the process of FIG. 2, the vapor boilup at the bottom of the secondary distillation zone 236 is provided by vaporizing a portion of the bottoms liquid in heat exchanger 262. In an alternative embodiment, some vapor boilup can be provided by bringing a suitable vapor stream from another location in the plant and feeding that vapor stream to the bottom of the secondary distillation zone. In one example, all of the liquid stream 260 could be sent to another unit operation such as another distillation column, and all of the vapor stream in line 266 could be derived from another unit operation in the plant. In this example, all of the vapor stream is recovered external to the multizone distillation column 220 and could come from any suitable location in the plant, such as another distillation column.

In yet another example of an external heat source, a portion of the vapor stream from stream 240 can be compressed in an external compressor and then condensed by heat exchange in heat exchanger 262. This is an example of a heat pump, and since an external compressor is used to drive this heat pump, it is easy to control the flow of stream to be condensed in heat exchanger 262. This heat pump also is considered as an external heat source for heat exchanger 262. Similarly, the condensing heat exchanger 272 could be heat pumped with any suitable reboiler by using an external compressor. Also, from the secondary distillation zone 238, all of the vapor stream 270 could be withdrawn either as product or fed to another unit operation in a plant; and the liquid reflux in line 276 could be obtained from any suitable location in the plant.

In FIG. 2, the vertical partitions 230 and 232 are located at the same radial location in the multizone distillation column. However, this is not essential for the practice of the present invention. Both of the vertical partitions may be located at different radial positions within the multizone distillation column. Similarly, it is not essential that the end separating element 234 be shared by the two secondary distillation zones 236 and 238. Each secondary distillation zone could have its own end separating element. Also, each vertical partition can be of any desired shape. For example, the vertical partition can be a vertical wall, in which case the secondary distillation zone is the region bounded by the vertical wall and the outer wall of the multizone distillation column. Alternatively, the vertical partition may be a cylinder that could be located at any radial position within the multizone distillation column. In this case, the secondary distillation zone can be the region inside the cylinder or the annular region between the outer wall of the cylinder and the outer wall of the multizone distillation column. When the vertical partition is a cylinder and the secondary distillation zone is the region inside the cylinder, then the cross sectional area of the secondary distillation zone is a circle. Alternatively, a vertical partition having a shape other than a cylinder may be used, in which case the cross sectional area of the secondary distillation zone may be a triangle, square, hexagon or any other desired shape.

Figure 3:
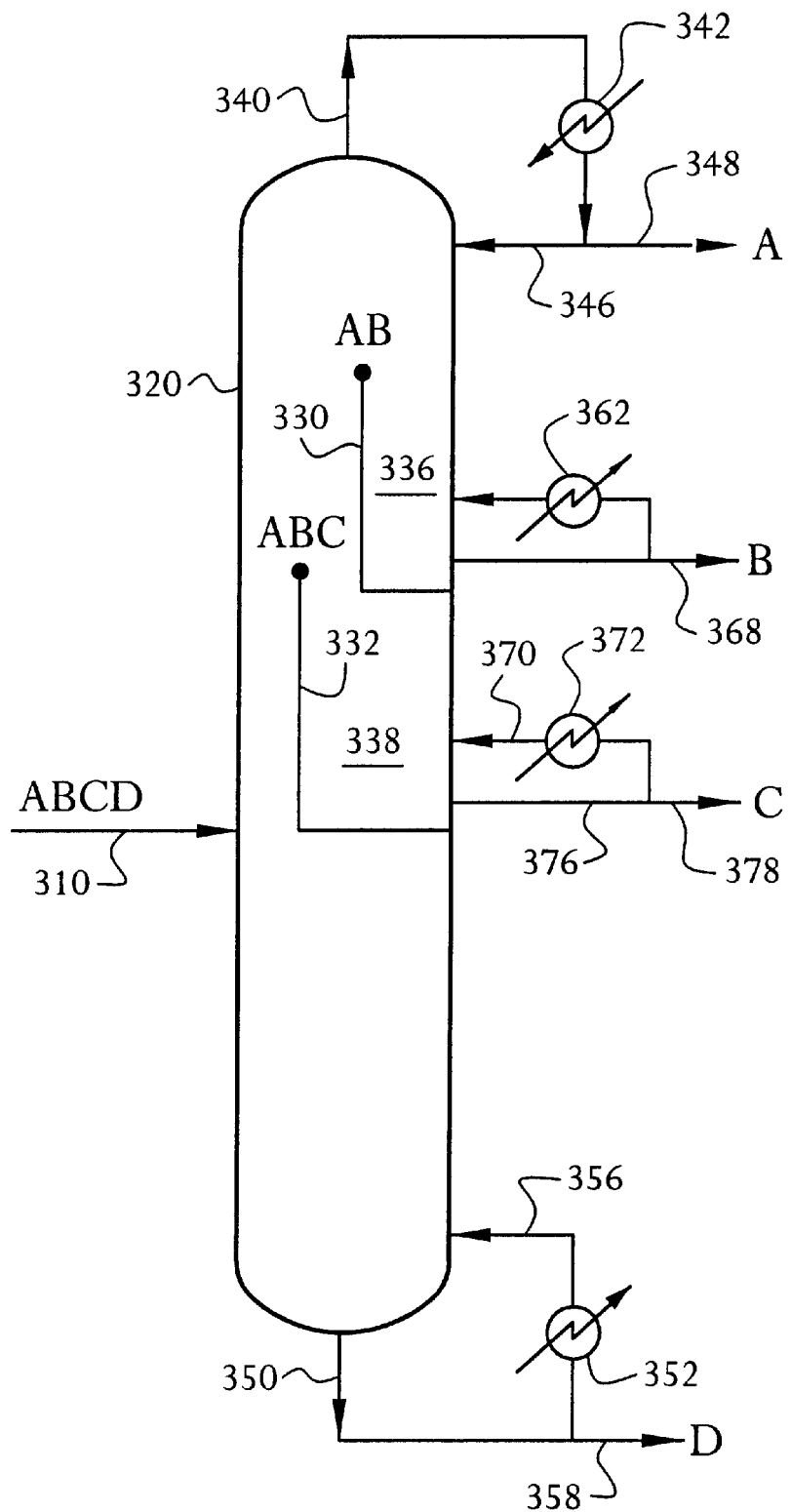
FIG. 3 is a schematic diagram of another embodiment of the present invention.

FIG. 3 shows another process according to the present invention to distill a four-component mixture. Both of the secondary distillation zones 336 and 338 are located in the rectifying section of the multizone distillation column 320. While the secondary distillation zone 336 and its operation are similar to the secondary distillation zone 236 (in FIG. 2), the secondary distillation zone 338 is different from the secondary distillation zone 238 (in FIG. 2). For FIG. 3, a liquid stream (ABC) lean in the least volatile component D but rich in component C is fed at the top of the vertical partition 332. A portion of the bottoms liquid 376 from the secondary distillation zone 338 is recovered as a C-enriched product stream 378, and the other portion is vaporized in heat exchanger 372 using an external heat source to provide vapor boilup for this secondary distillation zone. Note that in FIG. 3 both of the heat exchangers 362 and 372 are vaporizers.

Alternately, it is possible to have a multizone distillation column with both of the secondary distillation zones in the stripping section. In this case, FIG. 2 would be modified to move the secondary distillation zone producing B-enriched product below the feed location 210. Now, a vapor stream lean in the most volatile component A but rich in component B would be fed at the bottom of the secondary distillation zone and a B-enriched product would be produced from the top of this secondary distillation zone. In this case, each of the secondary distillation zones would have condensers associated with it.

Figure 4:
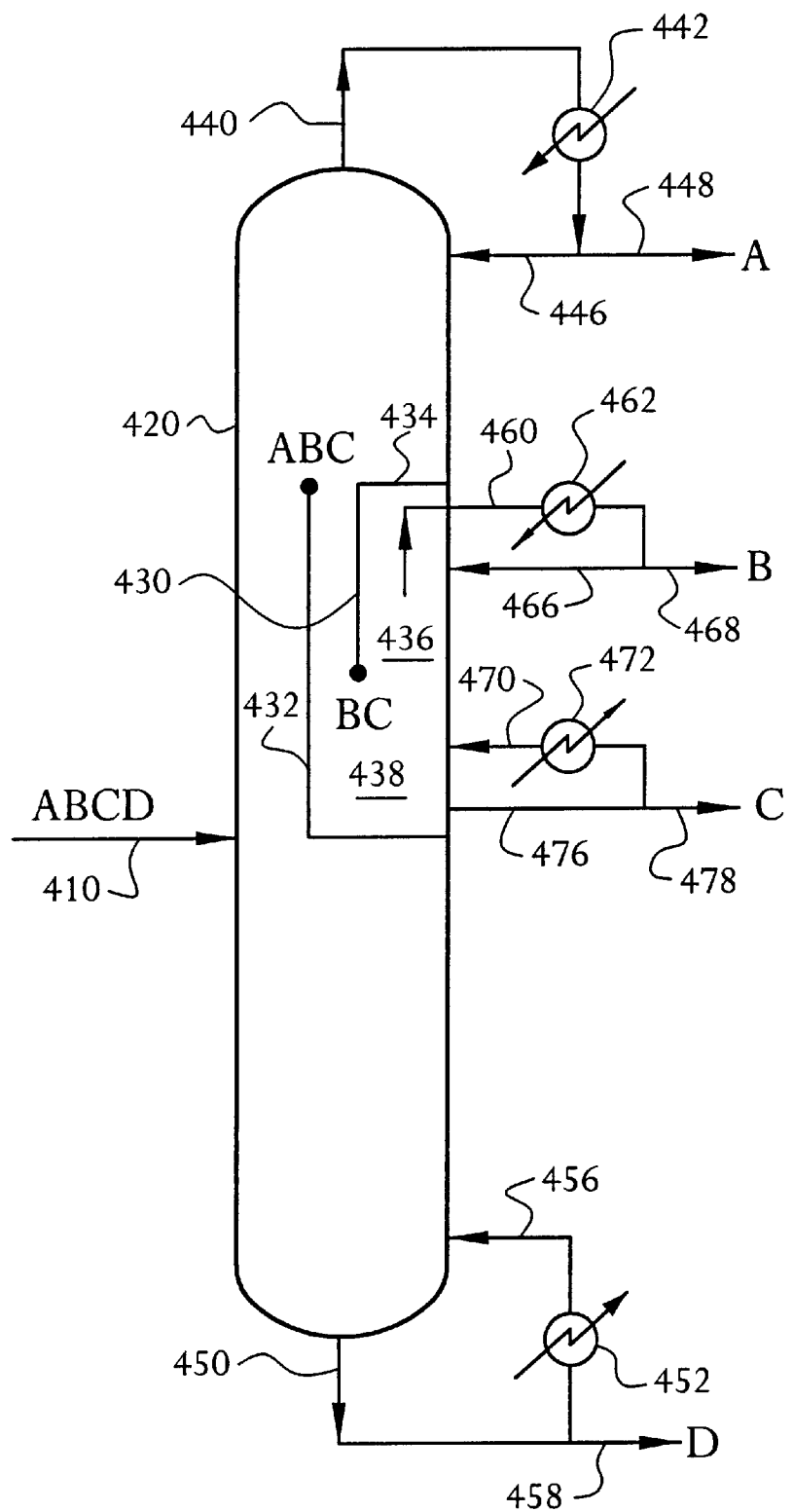
FIG. 4 is a schematic diagram of another embodiment of the present invention.

FIG. 4 shows a multizone distillation column 420 where a secondary distillation zone 436 receives its feed from another secondary distillation zone 438. In the multizone distillation column, secondary distillation zone 438 and the associated production of C-enriched product stream 478 are similar to the secondary distillation zone 338 and the production of C-enriched product stream 378 in FIG. 3. However, the secondary distillation zone 436 and the associated production of B-enriched product stream 468 are quite different than the secondary distillation zone 336 and the production of B-enriched product stream 368 in FIG. 3. The liquid feed (ABC) to the secondary distillation zone 438 is depleted in the least volatile component D and contains three other components A, B and C. As this liquid descends in the secondary distillation zone 438, at some height both the liquid and vapor phases are depleted in the most volatile component A but contain both B and C. At the bottom of the vertical partition 430, a vapor stream (BC) rich in both components B and C but depleted in the most volatile component A is fed from the secondary distillation zone 438 to the secondary distillation zone 436. The top of the secondary distillation zone 436 has an end separating element 434. A vapor stream 460 enriched in the component of intermediate volatility B is recovered from the top of secondary distillation zone 436. This vapor stream is condensed in a heat exchanger 462 by using an external cold utility. A portion 468 of the condensed stream is recovered as B-enriched product, while the other portion is returned as liquid reflux 466 to the secondary distillation zone 436.

Figure 5:
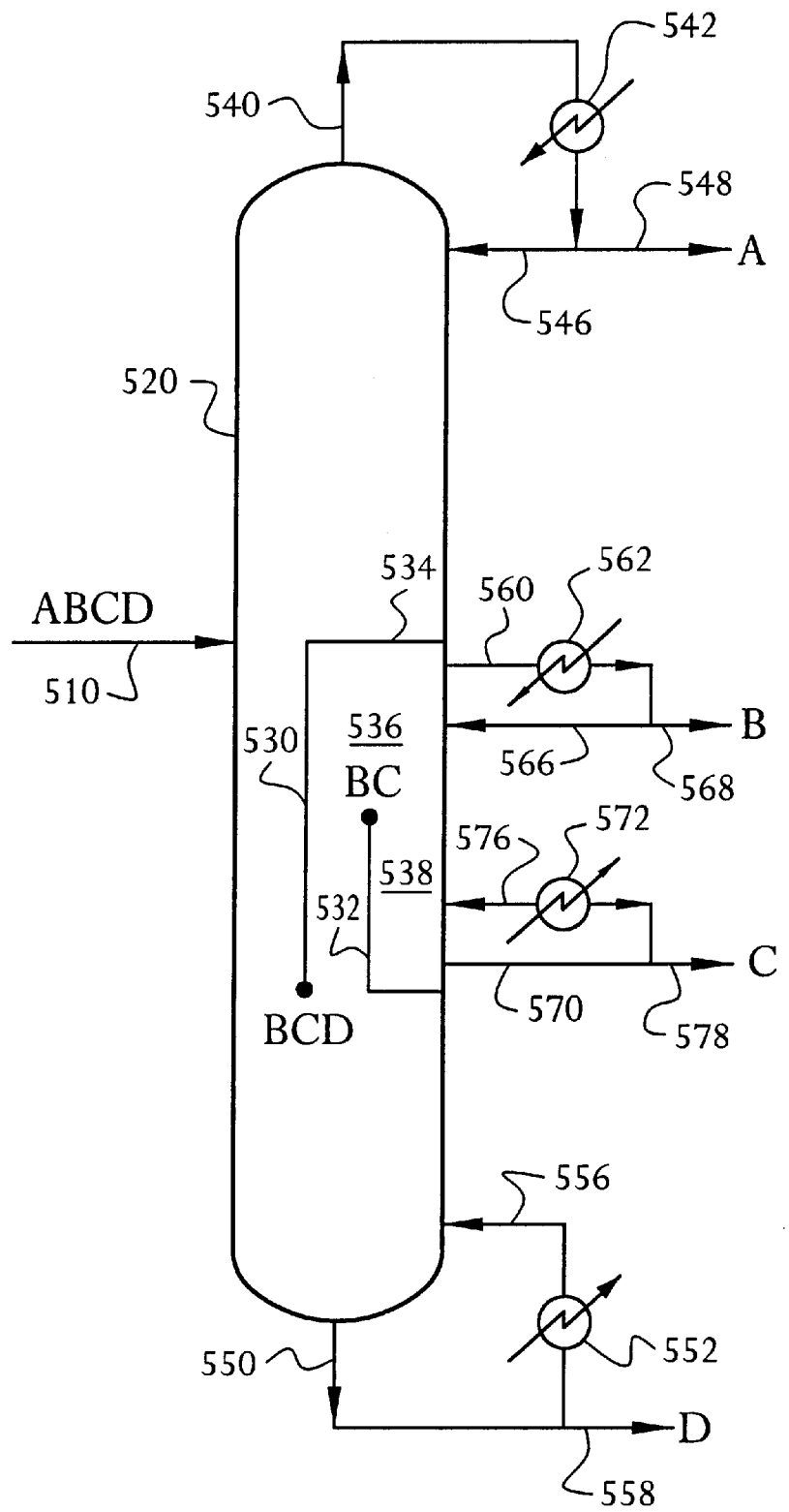
FIG. 5 is a schematic diagram of another embodiment of the present invention.

FIG. 5 shows a multizone distillation column 520 where a secondary distillation zone 538 receives its feed from another secondary distillation zone 536 but both of the secondary distillation zones are located in the stripping section of the multizone distillation column. The secondary distillation zone 536 with the vertical partition 530 and the end separating element 534 produces a B-enriched product stream 568. The secondary distillation zone 538 receives a liquid feed (BC) containing primarily components B and C from the secondary distillation zone 536. The C-enriched product stream 578 is produced from the bottom of the secondary distillation zone 538.

Figure 6:
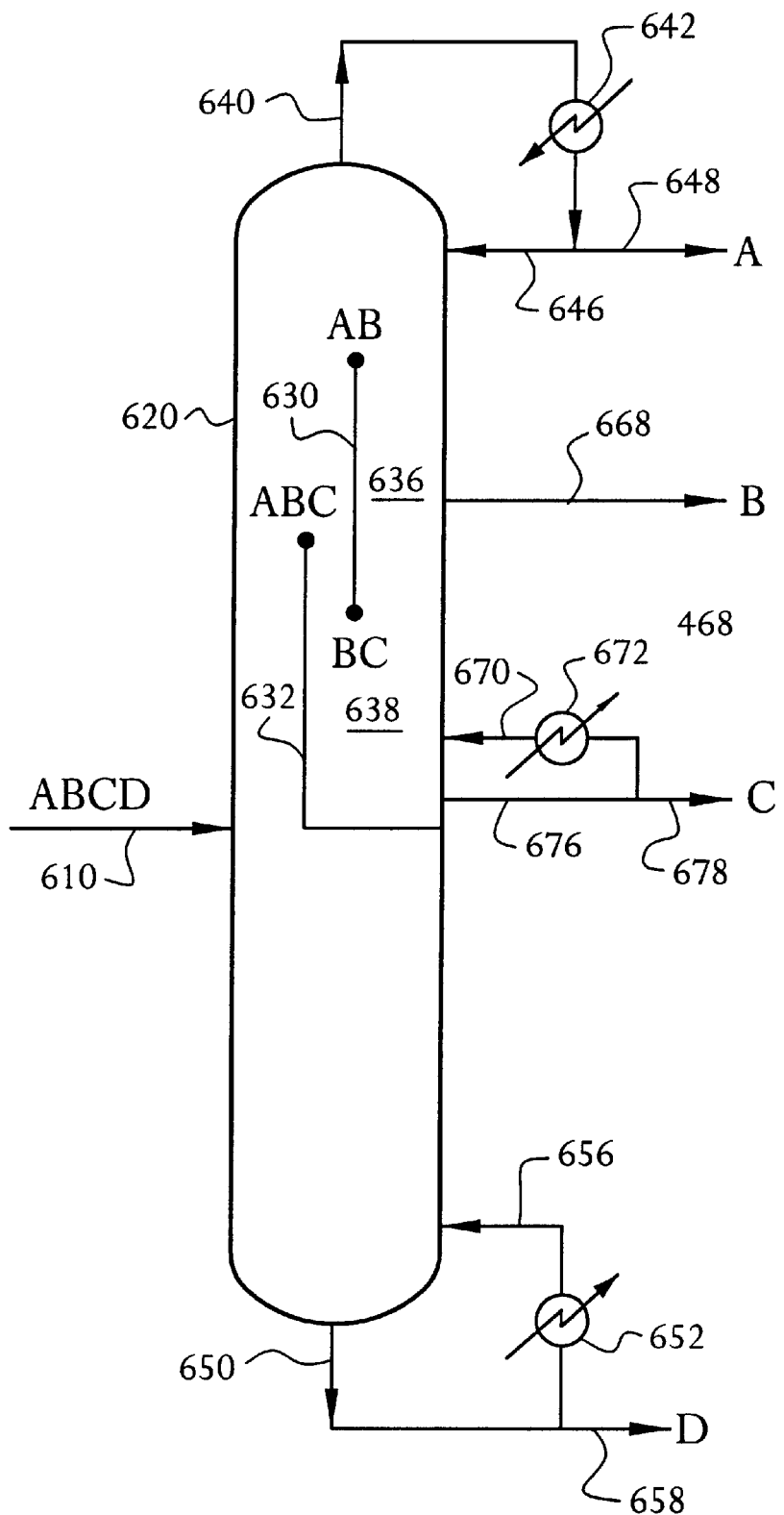
FIG. 6 is a schematic diagram of another embodiment of the present invention.

FIG. 6 shows another multizone distillation column 620 where one secondary distillation zone 636 does not use an external heat or cold duty. Instead, this secondary distillation zone has mass transfer at both of its ends from the other zones of the multizone distillation column. In FIG. 6, the secondary distillation zone 638 is similar to the secondary distillation zone 438 in FIG. 4. However, unlike the secondary distillation zone 436 in FIG. 4, the secondary distillation zone 636 in FIG. 6 does not have an end separating element. Instead, the top end of the vertical partition 630 is in communication with the primary distillation zone. A liquid stream (AB) depleted in heavier components C and D but rich in B and containing A is transferred from the primary distillation zone to the secondary distillation zone 636 at the top of the vertical partition 630. This provides the needed liquid reflux to the secondary distillation zone 636. The B-enriched product stream 668 is collected from an intermediate location of the secondary distillation zone 636.

Figure 7:
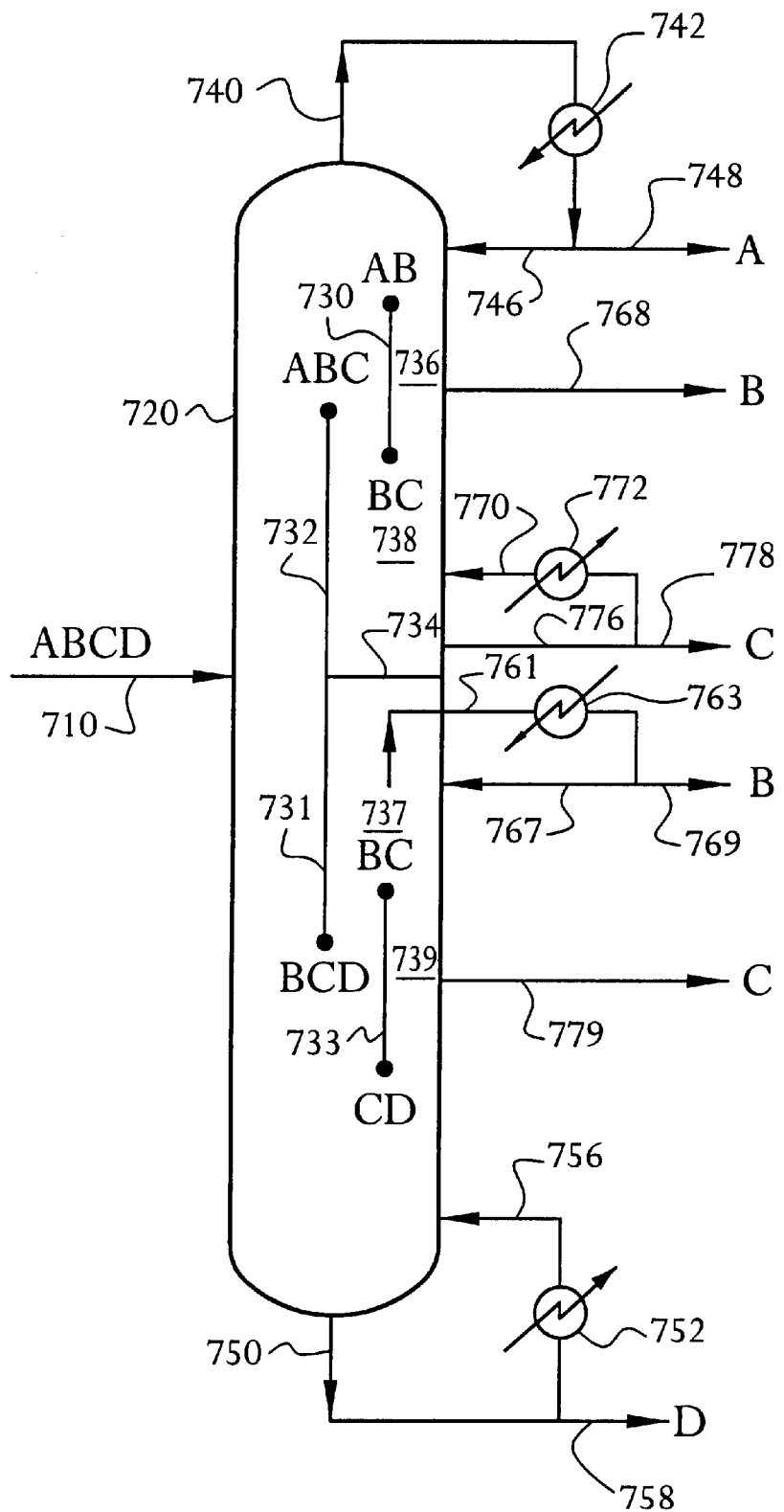
FIG. 7 is a schematic diagram of another embodiment of the present invention.

Persons skilled in the art will recognize that an alternate embodiment analogous to the embodiment shown in FIG. 6 can be drawn with the secondary distillation zones in the stripping section of the multizone distillation column. While such a multizone distillation column could be used by itself, FIG. 7 shows a multizone distillation column 720 where two secondary distillation zones are used in each of the rectifying and stripping sections. The secondary distillation zones 736 and 738 in the rectifying section of the multizone distillation column 720 are similar to the secondary distillation zones 636 and 638 in FIG. 6. The secondary distillation zone 737 is similar to the secondary distillation zone 536 in FIG. 5. However, the secondary distillation zone 739 does not have an end separating element at the bottom. Instead, a vapor stream (CD) nearly depleted in the more volatile components A and B but containing C and D is fed at the bottom of the secondary distillation zone 739 from the primary distillation zone. The C-enriched product stream 779 is produced from an intermediate location of the secondary distillation zone 739.

The multizone distillation column in FIG. 7 produces two product streams for each of the components B and C of intermediate volatility. The purity of each of the two product streams may be the same or different. Thus, the B-enriched product stream 768 may be less pure than the B-enriched product stream 769 or vice versa. It is worth noting that the multizone distillation columns in FIGS. 3 through 5 also could be easily modified to produce an additional B-enriched product stream and/or an additional C-enriched product stream.

While the processes in FIGS. 2 through 7 are demonstrated for a four-component mixture, each can easily be modified and used with feed mixtures containing three or more components. For example, if the feed to the multizone distillation column in FIG. 2 contained only three components A, B and C, then both of the secondary distillation zones 236 and 238 would produce B-enriched product streams.

Figure 8:
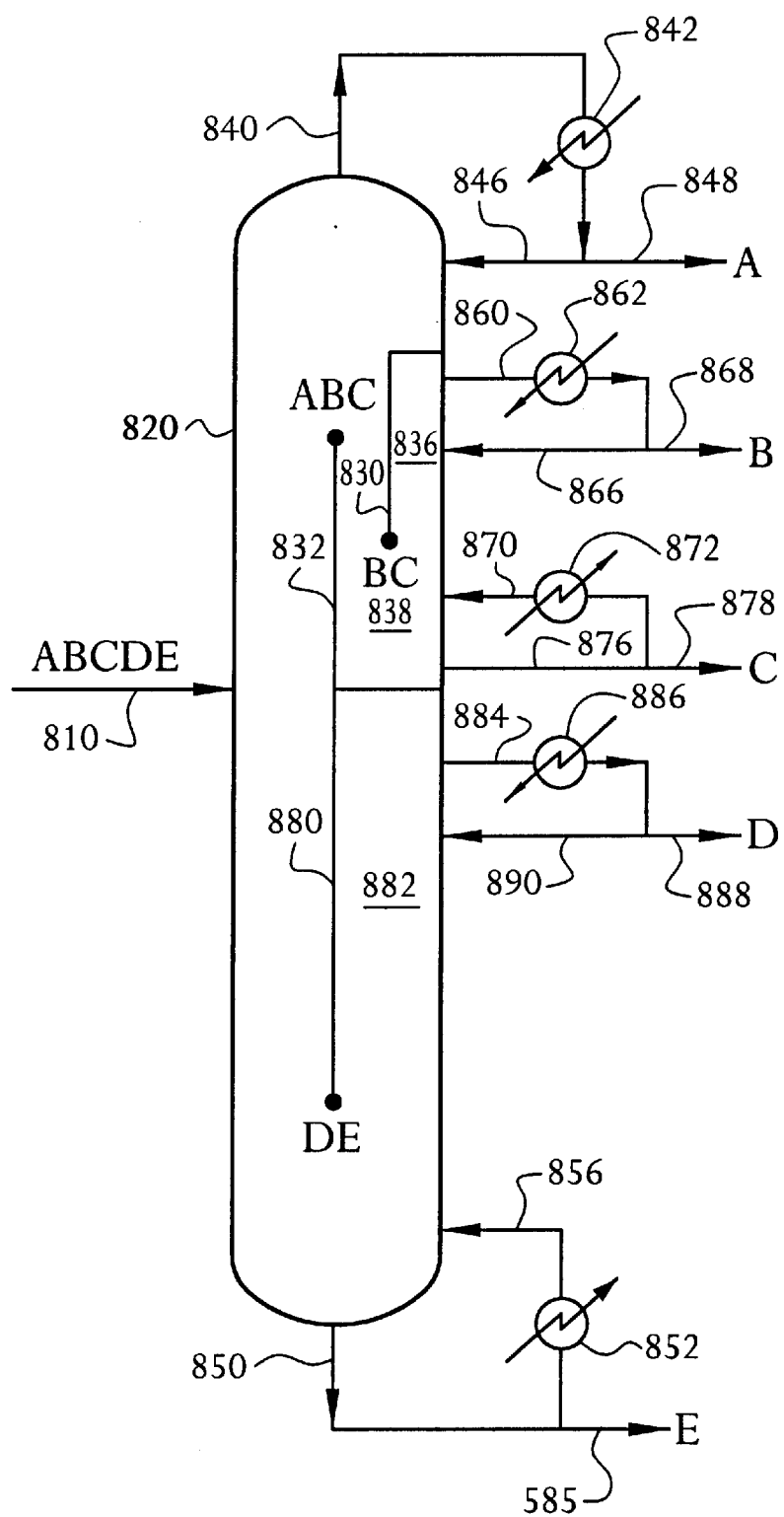
FIG. 8 is a schematic diagram of another embodiment of the present invention.

FIG. 8 shows a process using three secondary distillation zones 836, 838 and 882 to distill a five-component feed mixture into five product streams. Secondary distillation zones 836 and 838 are similar to the secondary distillation zones 436 and 438 in FIG. 4. The secondary distillation zone 882 is similar to the secondary distillation zone 238 in FIG. 2, but secondary distillation zone 882 produces D-enriched product stream 888 (rather than a C-enriched product stream as in FIG. 2). At the bottom of the vertical partition 880, a vapor mixture (DE) lean in the more volatile components A, B and C but containing D and E is fed to secondary distillation zone 882. Persons skilled in the art will recognize, after considering the process in FIG. 8, that the present invention can be applied to a feed mixture containing four or more components.

The processes in FIGS. 2 through 8 are just some examples of the present invention and are not intended to be limiting. Persons skilled in the art will recognize that many more multizone distillation column configurations are possible based on the teachings of the present invention.

In FIGS. 1 through 8 some of the streams are designated by alphabetical names. This shows the particular component (s) in which that stream is enriched, and does not necessarily mean the absence of other components. Thus, a stream labeled A indicates a product stream enriched in component A, which could be a pure product stream or a stream contaminated with significant quantities of other components. Similarly, a stream labeled AB means that the stream is enriched in components A and B, and the stream either contains only components A and B or could contain smaller quantities of other heavier components, such as C.

The present invention is applicable to the separation by distillation of any suitable feed mixture containing three or more components. Some examples of feed streams for which the present invention is applicable include: nitrogen/oxygen/argon mixtures; benzene/toluene/xylene mixtures; nitrogen/carbon monoxide/methane mixtures; any combination of three or more components from C1 to C5 alcohols; any combination of three or more components from C1 to C6 hydrocarbons; or $C_4$, isomers.

A multizone distillation column can use any mass transfer contact device. It can be a tray, random packing, structured packing or any other suitable contact device. Furthermore, all of the zones of a multizone distillation column may not use the same contact device. For example, some sections of the multizone distillation column may use trays, while other sections may use structured packings. Even in the same zone, different contact devices may be used at different heights.

The present invention provides an economical and efficient method to distill a multicomponent feed stream. It allows to decrease the number of distillation columns and also the number of reboilers and condensers. This leads to reduced cost. Furthermore, the vapor and liquid flows can be easily controlled in each zone of the multizone distillation column. This makes it easier to control the operation of the distillation column. For example, in FIG. 2, the vapor flow in the secondary distillation zone 236 is controlled by the amount of liquid that is vaporized in heat exchanger 262. Similarly, the liquid traffic in the secondary distillation zone 238 is controlled by the amount of vapor that is condensed and returned as liquid reflux. This provides an external means to adjust the liquid to vapor ratio and, therefore, the purity of B-enriched and C-enriched product streams.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A process for separation of a multicomponent fluid containing at least three components, each component having a different volatility, into at least four product streams, said process using at least one multizone distillation column having a top, a bottom, a primary distillation zone, and at least two secondary distillation zones, each secondary distillation zone having a top and a bottom, comprising the steps of:
  feeding the multicomponent fluid into the primary distillation zone;
  transferring a first mixture from the primary distillation zone to a first secondary distillation zone, said first mixture being lean in at least one component of the multicomponent fluid;
  transferring a second mixture to a second secondary distillation zone from the first secondary distillation zone, said second mixture being lean in at least one other component of the multicomponent fluid or at least one component of the first mixture;
  removing a first product stream rich in a first component having a highest volatility from the top of the multizone distillation column;
  removing a second product stream rich in a second component having a lowest volatility from the bottom of the multizone distillation column;
  removing from the first secondary distillation zone or the second secondary distillation zone a third product stream rich in a third component having an intermediate volatility between the highest volatility and the lowest volatility; and
  feeding to the first secondary distillation zone or the second secondary distillation zone at least a portion of (i) a vapor boilup stream, or (ii) a liquid reflux stream, wherein the at least a portion of (i) the vapor boilup stream, or (ii) the liquid reflux stream, is fed from a source external to the multizone distillation column or through heat exchange with a utility source external to the multizone distillation column.

2. A process as in claim 1, wherein the vapor boilup stream is provided by vaporizing at least a portion of a liquid stream withdrawn from the first or second secondary distillation zone through heat exchange with an external heat source.

3. A process as in claim 1, wherein the liquid reflux stream is provided by condensing at least a portion of a vapor stream withdrawn from the first or second secondary distillation zone through heat exchange with an external cold source.

4. A process as in claim 1, wherein the multicomponent fluid contains at least four components.

5. A process as in claim 1, comprising the further step of removing from one of the at least two secondary distillation zones a fourth product stream rich in a fourth component having either the intermediate volatility of the third component or another intermediate volatility different than the intermediate volatility of the third component, said another intermediate volatility being between the highest volatility and the lowest volatility, wherein the fourth product stream and the third product stream are removed from different secondary distillation zones.

6. A process for separation of a multicomponent fluid containing at least three components, each component having a different volatility, into at least four product streams, said process using at least one multizone distillation column having a top, a bottom, a primary distillation zone, and at least two secondary distillation zones, each secondary distillation zone having a top and a bottom, comprising the steps of:
  feeding the multicomponent fluid into the primary distillation zone at a first location;
  transferring a first mixture from the primary distillation zone to a first secondary distillation zone at a second location below the first location, said first mixture being lean in at least one component of the multicomponent fluid;
  transferring a second mixture from the primary distillation zone to a second secondary distillation zone at a third location below the first location, said second mixture being lean in at least one other component of the multicomponent fluid or at least one component of the first mixture;
  removing a first product stream rich in a first component having a highest volatility from the top of the multizone distillation column;
  removing a second product stream rich in a second component having a lowest volatility from the bottom of the multizone distillation column;
  removing from the first secondary distillation zone or the second secondary distillation zone a third product stream rich in a third component having an intermediate volatility between the highest volatility and the lowest volatility; and
  feeding to the first secondary distillation zone or the second secondary distillation zone at least a portion of (i) a vapor boilup stream, or (ii) a liquid reflux stream, wherein the at least a portion of (i) the vapor boilup stream, or (ii) the liquid reflux stream, is fed from a source external to the multizone distillation column or through heat exchange with a utility source external to the multizone distillation column.

7. A process as in claim 6, wherein the vapor boilup stream is provided by vaporizing at least a portion of a liquid stream withdrawn from the first or second secondary distillation zone through heat exchange with an external heat source.

8. A process as in claim 1, wherein the vapor boilup stream is fed to the bottom of said secondary distillation zone.

9. A process as in claim 1, wherein the liquid reflux stream is fed to the top of said secondary distillation zone.

10. A process as in claim 1, wherein at least one secondary distillation zone has a cylindrical vertical separating element.

11. A cryogenic air separation unit using a process as in claim 1.

12. A process as in claim 1 wherein the multicomponent fluid is selected from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-n-butane-gasoline, and combinations of three or more components from C1 1 to C6 hydrocarbons or $C_4$ isomers.

13. A process as in claim 6, wherein the liquid reflux stream is provided by condensing at least a portion of a vapor stream withdrawn from the first or second secondary distillation zone through heat exchange with an external cold source.

14. A process as in claim 6, comprising the further step of removing from one of the at least two secondary distillation zones a fourth product stream rich in a fourth component having either the intermediate volatility of the third component or another intermediate volatility different than the intermediate volatility of the third component, said another intermediate volatility being between the highest volatility and the lowest volatility, wherein the fourth product stream and the third product stream are removed from different secondary distillation zones.

15. A process as in claim 6, wherein the multicomponent fluid is selected from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-n-butane-gasoline, and combinations of three or more components from C1 to C6 hydrocarbons or $C_4$ isomers.

* * * * *

UNITED STATES PATENT AND TRADEMARK OFFICE
CERTIFICATE OF CORRECTION

PATENT NO. : 6,250,106 B1
DATED : June 26, 2001
INVENTOR(S) : Rakesh Agrawal

It is certified that error appears in the above-identified patent and that said Letters Patent is hereby corrected as shown below:

Title page,
In the title, Item [54], delete "DISTALLATION" and substitute therefore
-- DISTILLATION --.

Column 12,
Line 53, delete "C1 1" and substitute therefore -- C1 --.

Signed and Sealed this

Twenty-second Day of January, 2002

Attest:

JAMES E. ROGAN
*Attesting Officer*     *Director of the United States Patent and Trademark Office*